United States Patent
Kim et al.

(10) Patent No.: US 12,269,965 B2
(45) Date of Patent: Apr. 8, 2025

(54) RESIN COMPOSITION AND MANUFACTURING METHOD OF COATING LAYER USING THE SAME

(71) Applicants: Samsung Display Co., Ltd., Yongin-si (KR); SAMHWA PAINTS INDUSTRIES CO., LTD., Ansan-si (KR)

(72) Inventors: Sung Kim, Yongin-si (KR); Hyun Sook Kim, Yongin-si (KR); Sung-Chan Jo, Yongin-si (KR); Kyung Lae Rho, Yongin-si (KR); Soo Im Jeong, Yongin-si (KR); Seung Kyu Lee, Yongin-si (KR); Jang Hwan Jeong, Yongin-si (KR); Jae Ho Choi, Yongin-si (KR); Soon Jong Kim, Incheon (KR); Seong Gea Kim, Ansan-si (KR); Jae Duck Jung, Siheung-si (KR); Dong Hyeok Oh, Gunpo-si (KR); Kyoung Seok Cho, Seongnam-si (KR)

(73) Assignees: Samsung Display Co., Ltd., Yongin-si (KR); Samhwa Paints Industries Co., Ltd., Ansan-si (KR)

(*) Notice: Subject to any disclaimer, the term of this patent is extended or adjusted under 35 U.S.C. 154(b) by 55 days.

(21) Appl. No.: 17/654,135

(22) Filed: Mar. 9, 2022

(65) Prior Publication Data
US 2022/0195237 A1 Jun. 23, 2022

Related U.S. Application Data

(62) Division of application No. 15/950,471, filed on Apr. 11, 2018, now abandoned.

(30) Foreign Application Priority Data

May 2, 2017 (KR) .......................... 10-2017-0056526

(51) Int. Cl.
*C09D 175/08* (2006.01)
*B05D 3/02* (2006.01)
(Continued)

(52) U.S. Cl.
CPC ......... *C09D 175/08* (2013.01); *B05D 3/0209* (2013.01); *C08G 18/12* (2013.01);
(Continued)

(58) Field of Classification Search
CPC ...... C09D 175/08; C08K 3/105; C08K 3/017; C08K 5/0025; C08K 5/11; C08K 3/10;
(Continued)

(56) References Cited

U.S. PATENT DOCUMENTS 3,594,222 A    7/1971  Wells
4,385,133 A *  5/1983  Alberino ............ C08G 18/4812
                                                    521/914
(Continued)

FOREIGN PATENT DOCUMENTS

CN       1884415 A    12/2006
CN     102101986 A     6/2011
(Continued)

OTHER PUBLICATIONS

GuangPing Li, "Chemistry and Application Principles Of Leather Chemical Materials", with partial English translation, China Light Industry Press, Apr. 1997, pp. 300-301.
(Continued)

*Primary Examiner* — Robert S Walters, Jr.
(74) *Attorney, Agent, or Firm* — Womble Bond Dickinson (US) LLP

(57) ABSTRACT

A resin composition according to an exemplary embodiment of the present disclosure includes a first polyol represented by Chemical Formula 1, a second polyol represented by
(Continued)

Chemical Formula 2, and a polyisocyanate, wherein the first polyol and the second polyol have a linear structure without a side chain.

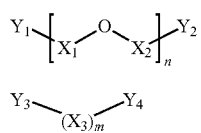

Chemical Formula 1

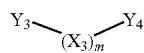

Chemical Formula 2 each of $Y_1$ to $Y_4$ is H or OH—, at least one of $Y_1$ and $Y_2$ is OH—, at least one of $Y_3$ and $Y_4$ is OH—, each of $X_1$ to $X_3$ is independently a $C_1$-$C_{20}$ alkyl group, the alkyl group includes or does not include an unsaturated bond, —$CH_2$— in the alkyl group may be substituted or unsubstituted with —CHOH—, and each of n and m is independently 1 to 200.

14 Claims, 2 Drawing Sheets

(51) Int. Cl.
    *C08G 18/12*     (2006.01)
    *C08G 18/24*     (2006.01)
    *C08G 18/48*     (2006.01)
    *C08G 18/73*     (2006.01)
    *C08K 3/017*     (2018.01)
    *C08K 3/105*     (2018.01)
    *C08K 5/00*     (2006.01)
    *C08K 5/11*     (2006.01)
    *C08K 3/10*     (2018.01)
    *C08K 5/29*     (2006.01)

(52) U.S. Cl.
CPC ....... *C08G 18/246* (2013.01); *C08G 18/4808* (2013.01); *C08G 18/4825* (2013.01); *C08G 18/73* (2013.01); *C08K 3/017* (2018.01); *C08K 3/105* (2018.01); *C08K 5/0025* (2013.01); *C08K 5/11* (2013.01); *B05D 3/0254* (2013.01); *B05D 2503/00* (2013.01); *C08K 3/10* (2013.01); *C08K 5/29* (2013.01)

(58) Field of Classification Search
CPC ...... C08K 5/29; B05D 3/0209; B05D 3/0254; B05D 2503/00; C08G 18/12; C08G 18/246; C08G 18/4808; C08G 18/4825; C08G 18/73

See application file for complete search history.

(56) References Cited

U.S. PATENT DOCUMENTS

| | | |
|---|---|---|
| 9,371,458 B2 | 6/2016 | Sato et al. |
| 2002/0119321 A1 | 8/2002 | Kurth et al. |
| 2005/0169975 A1 | 8/2005 | Suzuki et al. |
| 2006/0122076 A1 | 6/2006 | Malz et al. |
| 2011/0109849 A1 | 5/2011 | Yoo et al. |
| 2011/0117364 A1 | 5/2011 | Uesugi et al. |
| 2016/0017179 A1 | 1/2016 | Spyrou et al. |
| 2017/0253697 A1 | 9/2017 | Nakamura et al. |
| 2017/0265547 A1 | 9/2017 | Sick et al. |
| 2018/0123172 A1 | 5/2018 | Katsuyama |

FOREIGN PATENT DOCUMENTS

| | | |
|---|---|---|
| CN | 104232004 A | 12/2014 |
| CN | 104293157 A | 1/2015 |
| CN | 105885491 A | 8/2016 |
| JP | 2002-146212 A | 5/2002 |
| KR | 10-2005-0078990 A | 8/2005 |
| KR | 10-1145582 B1 | 5/2012 |
| KR | 10-1114354 B1 | 6/2012 |
| KR | 10-1200451 B1 | 11/2012 |
| KR | 10-2015-0005615 A | 1/2015 |
| KR | 10-1597178 B1 | 2/2016 |
| KR | 10-2016-0049825 A | 5/2016 |
| WO | WO 2016/042936 A1 | 3/2016 |

OTHER PUBLICATIONS

Linghao He and Minghua Wang, "Functional Polymer Materials" with partial English translation, Huazhong University of Science and Technology Press, Aug. 2016, p. 139.

Szycher, Michael; "Szycher's Handbook of Polyurethanes"; Second Edition; Jul. 2012; pp. 78.

Shide Huang et al., "Handbook of Bonding and Bonding Technology," Sichuan Science and Technology Press, (1990), pp. 400-402, with English translation.

Qiufeng An et al., "Additives for Processing Rubber and Plastic," Chemistry and Applied Chemistry Publishing Center, (2004), pp. 191-193, with English translation.

Hongfa Zhu, "A Handbook of Usual Crude Material for Fine Chemical Industry," Jin Dun Press, (2003), pp. 55-56, with English translation.

\* cited by examiner

RESIN COMPOSITION AND MANUFACTURING METHOD OF COATING LAYER USING THE SAME

CROSS-REFERENCE TO RELATED APPLICATION

This application is a divisional of U.S. patent application Ser. No. 15/950,471, filed Apr. 11, 2018, which claims priority to and the benefit of Korean Patent Application No. 10-2017-0056526 filed in the Korean Intellectual Property Office on May 2, 2017, the entire contents of which are incorporated herein by reference.

BACKGROUND

1. Field

Embodiments of the present disclosure relate to a resin composition and a manufacturing method of a coating layer using the resin composition.

2. Description of the Related Art

Recently, various kinds of display devices have been developed. A flat panel display generally includes a liquid crystal display (LCD), an organic light emitting diode (OLED) display, an electrophoretic display (EPD), and the like.

The flat panel display devices may transmit a clear image to a user without distortion. Therefore, a window laminated on the flat panel display may have high transmittance and flatness. In addition, as the number of a portable flat panel displays such as a smart phone or a tablet PC increases, the flat panel display may be frequently exposed to an external impact. Therefore, a flat panel display should be capable of withstanding an external impact.

In order to protect the flat panel display, various films may be laminated on a window of the flat panel display. In a manufacturing process, these films may be peeled off and then reattached after being formed on the window. While the film is reattached, bubbles may be inserted or form between the film and the window. Such a bubble insertion or formation may deteriorate aesthetic impression and visibility of the flat panel display.

SUMMARY

An exemplary embodiment of the present disclosure provides a resin composition for forming a coating layer having excellent bubble-free property in which bubbles are not inserted between a substrate and the coating layer when the substrate and the coating layer are reattaching after peeling.

In addition, an exemplary embodiment of the present disclosure provides a manufacturing method of a coating layer for forming a coating layer having excellent bubble-free property by using the resin composition.

According to an exemplary embodiment of the present disclosure, a resin composition includes first polyol represented by Chemical Formula 1, second polyol represented by Chemical Formula 2, and polyisocyanate, wherein the first polyol and the second polyol have a linear structure without a side chain.

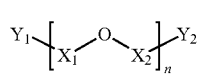

Chemical Formula 1

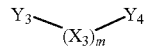

Chemical Formula 2 each of $Y_1$ to $Y_4$ is H or OH—, at least one of $Y_1$ and $Y_2$ is OH—, at least one of $Y_3$ and $Y_4$ is OH—, each of $X_1$ to $X_3$ is independently a C1-C20 alkyl group, the alkyl group includes or does not include an unsaturated bond, —$CH_2$— in the alkyl group may be substituted or unsubstituted with —CHOH—, and each of n and m is independently 1 to 200.

According to an exemplary embodiment of the present disclosure, the resin composition may further include a curing agent and antistatic agent, wherein the curing agent includes isocyanate.

According to an exemplary embodiment of the present disclosure, the curing agent may include a mixture of dodecanedioic acid and triglycidyl isocyanurate.

According to an exemplary embodiment of the present disclosure, the antistatic agent may include a compound represented by Chemical Formula 3.

M-A    Chemical Formula 3

M is a metal element, and A is at least one selected from a chloride anion (Cl$^-$), a bromide anion (Br$^-$), an iodide anion (I$^-$), a tetrachloroaluminate anion (AlCl$_4^-$), a heptachlorodialuminate anion (Al$_2$Cl$_7^-$), a tetrafluoroborate anion (BF$_4^-$), a hexafluorophosphate anion (PF$_6^-$), a perchlorate anion (ClO$_4^-$), a nitrate anion (NO$_3^-$), an acetate anion (CH$_3$COO$^-$), a trifluoroacetate anion (CF$_3$COO$^-$), a methane sulfonate anion (CH$_3$SO$_3^-$), a trifluoromethanesulfonate anion (CF$_3$SO$_3^-$), a p-toluenesulfonate anion (p-CH$_3$C$_6$H$_4$SO$_3^-$), a bis (fluorosulfonyl) imide anion ((FSO$_2$)$_2$N$^-$), a bis (trifluoromethanesulfonyl) imide anion ((CF$_3$SO$_2$)$_2$N$^-$), a tris (trifluoromethanesulfonyl) (CF$_3$SO$_2$)$_3$C$^-$), a hexafluoroacenate anion (AsF$_6^-$), a hexafluoroantimonate anion (SbF$_6^-$), a hexafluoroniobate anion (NbF$_6^-$), a hexafluorotantalate anion (TaF$_6^-$), dimethylphosphinate ((CH$_3$)$_2$POO$^-$), a dicyanamide anion ((CN)$_2$N$^-$), a thiocyanic anion (SCN$^-$), a perfluorobutane sulfonate anion (C$_4$F$_9$SO$_3^-$), a bis (pentafluoroethanesulfonyl) imide anion ((C$_2$F$_5$SO$_2$)$_2$N$^-$) and a perfluorobutanoate anion (C$_3$F$_7$COO$^-$).

According to an exemplary embodiment of the present disclosure, the antistatic agent may be a lithium-based antistatic agent including a lithium element.

According to an exemplary embodiment of the present disclosure, the resin composition may further include a tin-based catalyst.

According to an exemplary embodiment of the present disclosure, the resin composition includes 10 to 20 parts by weight of the second polyol, and 3 to 8 parts by weight of the polyisocyanate, with respect to 100 parts by weight of the first polyol.

According to an exemplary embodiment of the present disclosure, the resin composition may further include at least one solvent selected from the group consisting of toluene, acetone, cyclohexanone, ethyl cellusolve, ethyl acetate, isopropyl alcohol, and ethylene glycol monomethyl ether.

According to an exemplary embodiment of the present disclosure, the resin composition may further include a heat stabilizer, wherein the heat stabilizer may be a phenolic compound, a phospho compound, or a thio compound.

According to an exemplary embodiment of the present disclosure, a manufacturing method of a coating layer includes forming a resin composition by mixing first polyol represented by Chemical Formula 1, second polyol represented by Chemical Formula 2, and polyisocyanate together with a first solvent, coating the resin composition on a substrate, and aging the resin composition, wherein the first polyol and the second polyol have a linear structure without a side chain.

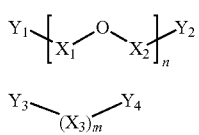

Chemical Formula 1

Chemical Formula 2 each of $Y_1$ to $Y_4$ is H or OH—, at least one of $Y_1$ and $Y_2$ is OH—, at least one of $Y_3$ and $Y_4$ is OH—, each of $X_1$ to $X_3$ is independently a C1-C20 alkyl group, the alkyl group includes or does not include an unsaturated bond, —$CH_2$— in the alkyl group may be substituted or unsubstituted with —CHOH—, and each of n and m is independently 1 to 200.

According to an exemplary embodiment of the present disclosure, forming the resin composition may further include mixing a mixture of a second solvent different from the first solvent, a curing agent and an antistatic agent mixture with a mixture of the first polyol, the second polyol, the polyisocyanate and the first solvent.

According to an exemplary embodiment of the present disclosure, the manufacturing method of a coating layer may further include heating the mixture of the first polyol, the second polyol, the polyisocyanate and the first solvent to remove isocyanate bonds in the mixture of the first polyol, the second polyol, the polyisocyanate, and the first solvent.

According to an exemplary embodiment of the present disclosure, the mixture of the first polyol, the second polyol, the polyisocyanate and the first solvent may be heated at 60° C. to 90° C.

According to an exemplary embodiment of the present disclosure, a heat stabilizer may be added to the heated mixture of the first polyol, the second polyol, the polyisocyanate and the first solvent.

According to an exemplary embodiment of the present disclosure, aging the resin composition may include heating the resin composition at 40° C. to 140° C.

According to an exemplary embodiment of the present disclosure, aging the resin composition may include a plurality of heating acts.

According to an exemplary embodiment of the present disclosure, aging the resin composition may include a first heating act, a second heating act, a third heating act, a fourth heating act, and a fifth heating act.

According to an exemplary embodiment of the present disclosure, a process temperature of the first heating act to the third heating act is less than a process temperature of the fourth heating act and the fifth heating act.

According to an exemplary embodiment of the present disclosure, a resin composition having excellent bubble-free property and free from substrate contamination may be provided.

However, the effects of embodiments of the present disclosure are not limited to the above-described effects, and may be variously extended without departing from the spirit and scope of the present disclosure.

BRIEF DESCRIPTION OF THE DRAWINGS

The accompanying drawings, together with the specification, illustrate embodiments of the subject matter of the present disclosure, and, together with the description, serve to explain principles of embodiments of the subject matter of the present disclosure.

DETAILED DESCRIPTION

Figure 1:
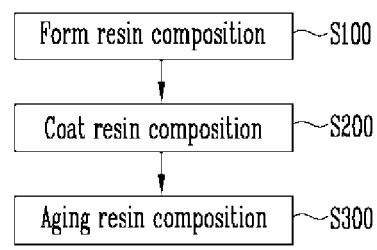
FIG. 1 is a flowchart illustrating a manufacturing method of a coating layer according to an exemplary embodiment of the present disclosure.

It will be apparent to those skilled in the art that various modifications and variations can be made to the subject matter of the present disclosure without departing from the spirit or scope of the disclosure, and certain exemplary embodiments are exemplified in the drawings and explained in the detailed description. Thus, it is intended that the present disclosure covers modifications and variations of the subject matter of the present disclosure included within the spirit and scope of the present disclosure and their equivalents.

Like reference numerals designate like elements throughout the specification. In the accompanying drawings, dimensions of structures are exaggerated for clarity. The terms, 'first', 'second' and the like may be simply used for description of various constituent elements, but those meanings may not be limited to the restricted meanings. The above terms are used only for distinguishing one constituent element from other constituent elements. For example, a first constituent element may be referred to as a second constituent element and similarly, the second constituent element may be referred to as the first constituent element within the scope of the appended claims, and equivalents thereof. When explaining the singular, unless explicitly described to the contrary, it may be interpreted to also have the plural meaning.

In the specification and claims, the word "comprise" or "has" is used to specify existence of a feature, a numbers, a process, an operation, a constituent element, a part, or a combination thereof, and it will be understood that existence or additional possibility of one or more other features or numbers, processes, operations, constituent elements, parts, or combinations thereof are not excluded in advance. In addition, it will be understood that when an element such as a layer, film, region, or substrate is referred to as being "on" another element, it can be directly on the other element or intervening elements may also be present. In the specification and claims, it will be understood that when an element such as a layer, film, region, or substrate is referred to as being disposed "on" another element, the disposed direction is not limited to an upper direction and include a side direction or a lower direction. In contrast, it will be understood that when an element such as a layer, film, region, or substrate is referred to as being "beneath" another element, it can be directly beneath the other element or intervening elements may also be present.

In the present specification and claims, the terms 'upper side' and 'lower side' are used in a relative sense in order to facilitate understanding of the technical idea of embodiments of the present disclosure. Thus, the terms 'upper side' and 'lower side' do not refer to a particular direction, position, or element, and are interchangeable. For example, 'upper side' may be interpreted as 'lower side', and 'lower side' may be interpreted as 'upper side'. Therefore, 'upper side' may be expressed as 'first side', 'lower side' may be expressed as 'second side', 'lower side' may be expressed as 'first side', and 'upper side' may be expressed as 'second side'. However, in one exemplary embodiment, 'upper side' and 'lower side' are not mixed (e.g., the terms are not interchangeable).

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

After a resin composition according to an exemplary embodiment of the present disclosure is coated on a substrate, the resin composition may be aged so as to form a coating layer. The coating layer may be provided alone or with another film on the substrate. Thus, the resin composition and the coating layer made from the resin composition may have adhesive characteristics for bonding the film to the substrate.

The resin composition according to an exemplary embodiment of the present disclosure does not include a silicone resin. In the existing art, a silicone resin has been used to improve a bubble-free property of a coating layer or an adhesive layer.

Bubble free means that bubbles are not (or substantially not) inserted or formed between a coating layer and a substrate. For example, the bubble-free property means that bubbles are not (or substantially not) inserted or formed between the coating layer and the substrate, not only when the coating layer is formed on the substrate, but also when the formed coating layer is peeled off from the substrate and then reattached on the substrate. For example, the coating layer and the substrate may be completely free of bubbles (e.g., pockets of air or other gases) between the coating layer and the substrate.

As the coating layer or the adhesive layer has the bubble-free property, an adhesion of the coating layer to the substrate can be maintained even if the coating layer and the substrate are repeatedly peeled and bonded. In addition, since there is no bubble between the substrate and the coating layer, the coating layer can be more closely bonded to the substrate.

The coating layer or the adhesive layer including the existing silicone resin may have excellent bubble-free properties because a surface tension is relatively low. However, the coating layer or the adhesive layer including the silicone resin substrate may contaminate the substrate. For example, a Si—O group in the silicone resin may chemisorb with a surface of the substrate. In certain embodiments, when the substrate includes silicon together with glass, the Si—O group in the silicone resin may react with the silicon on the surface of the substrate to form siloxane. If the silicone resin is chemisorbed on the surface of the substrate, the surface of the substrate may be contaminated and the visibility may be deteriorated. Further, the physical properties of the substrate may be changed to deteriorate impact resistance and flexibility.

Since a resin composition according to an exemplary embodiment of the present disclosure does not include a silicone resin, the substrate is not contaminated by chemisorption of the silicone resin.

In addition, a resin composition according to an exemplary embodiment of the present disclosure does not include a plasticizer. In the existing art, a plasticizer such as isopropyl myristate was added to the resin composition to improve bubble-free property of the coating layer or the adhesive layer. The plasticizer imparts flexibility to the resin composition and the coating layer or the adhesive layer made therefrom. Therefore, the resin composition including the plasticizer and the coating layer or the adhesive layer made therefrom may have a relatively excellent bubble-free property. However, the plasticizer may be transferred from the coating layer or the adhesive layer to the substrate. The plasticizer may be easily transferred to the substrate due to good compatibility in general. The plasticizer transferred to the substrate may contaminate the substrate like the silicone resin chemisorbed on the substrate. Such contamination of the substrate may deteriorate visibility and impact resistance.

Since a resin composition according to an exemplary embodiment of the present disclosure does not include a plasticizer, the substrate is not contaminated by transition of the plasticizer.

The resin composition according to an exemplary embodiment of the present disclosure does not include a plasticizer or a silicone resin (e.g., the resin is free of a plasticizer and/or a silicone resin) but has an excellent bubble-free property. For this purpose, a resin composition according to an exemplary embodiment of the present disclosure may include a first polyol represented by Chemical Formula 1, a second polyol represented by Chemical Formula 2, and polyisocyanate, where the first polyol and the second polyol have a linear structure without a side chain.

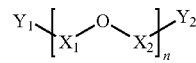

Chemical Formula 1

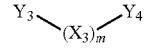

Chemical Formula 2

Herein, each of $Y_1$ to $Y_4$ is H or OH—, at least one of $Y_1$ and $Y_2$ is OH—, at least one of $Y_3$ and $Y_4$ is OH—, each of $X_1$ to $X_3$ is independently a C1-C20 alkyl group, the alkyl group includes or does not include an unsaturated bond, —$CH_2$— in the alkyl group may be substituted or unsubstituted with —CHOH—, and each of n and m is independently 1 to 200.

The first polyol may be a single material (e.g., a single or sole chemical compound) or a mixture of two or more materials having a structure of Chemical Formula 1. For example, the first polyol may include at least one selected from materials having a structure of Chemical Formula 1-1 to Chemical Formula 1-5. However, materials having a structure of the Chemical Formula 1-1 to Chemical Formula 1-5 are merely examples of materials that may be used as the first polyol, and the structure of the first polyol is not limited to the Chemical Formula 1-1 to Chemical Formula 1-5.

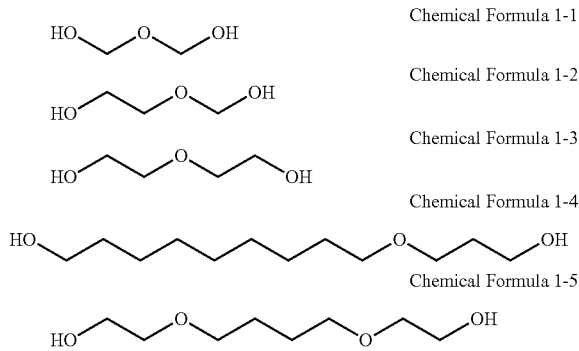

The second polyol may be a single material (e.g., a single or sole chemical compound) or a mixture of two or more materials having a structure of Chemical Formula 2. For example, the second polyol may include at least one selected from materials having a structure of Chemical Formula 2-1 to Chemical Formula 2-3. However, materials having a structure of the Chemical Formula 2-1 to Chemical Formula 2-3 are merely examples of materials that may be used as the second polyol, and the structure of the second polyol is not limited to the Chemical Formula 2-1 to Chemical Formula 2-3.

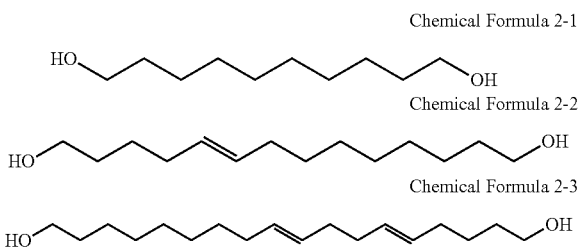

The first polyol and the second polyol have a linear structure without a side chain. Herein, the side chain means a group substituted with hydrogen existing in a main chain composed of a carbon-carbon bond. Since the first polyol and the second polyol according to an exemplary embodiment of the present disclosure have a linear structure without a side chain, they may react with isocyanate to form a linear polymer. For example, the linear polymer may be a polyurethane resin. The linear polymer may be flexible and wettability of the coating layer including the linear polymer may be improved because it has no side chains. As the flexibility and wettability of the coating layer are improved, the coating layer may have a bubble-free property.

The first polyol may have a viscosity of about 0.85 pascal seconds (Pa·s) to about 1.35 Pa·s at about 20° C. The viscosity of the first polyol affects a viscosity of the resin composition including the first polyol. When the first polyol has a viscosity lower than the viscosity of the above range, a viscosity of the resin composition decreases so that the resin composition coated on the substrate may flow down. On the other hand, when the first polyol has a viscosity higher than the viscosity of the above range, a viscosity of the resin composition increases, and it may be difficult to uniformly or substantially uniformly coat the resin composition.

The first polyol may have a hydroxyl value of about 25.0 mg KOH/g to about 29.0 mg KOH/g. By having the hydroxyl value of the above range, the first polyol may react with other components in the resin composition so as to provide a coating layer having an excellent bubble-free property.

The second polyol may have a density of about 1.05 g/ml to about 1.12 g/ml at about 20° C. However, a density of the second polyol may change depending on a form of the second polyol. For example, as a length of a main chain of the second polyol becomes longer, a density of the second polyol may be relatively low.

The second polyol may have a viscosity of about 0.15 Pa·s to about 0.19 Pa·s at about 20° C. The viscosity of the second polyol affects a viscosity of the resin composition including the second polyol. When the second polyol has a viscosity lower than the viscosity of the above range, a viscosity of the resin composition decreases so that the resin composition coated on the substrate may flow down. On the other hand, when the second polyol has a viscosity higher than the viscosity of the above range, a viscosity of the resin composition increases, and it may be difficult to uniformly or substantially uniformly coat the resin composition.

The polyisocyanate may be a material including a plurality of isocyanate groups (—NCO). Examples of the polyisocyanate include aromatic isocyanate compounds such as 2,4-tolylene diisocyanate, 2,6-tolylene diisocyanate, 1,3-xylylene diisocyanate, 4,4'-diphenyl diisocyanate, 1,5-naphthalene diisocyanate, 4,4'-diphenylmethane diisocyanate, and the like; compounds having two isocyanate groups bonded to alicyclic hydrocarbons such as dicyclohexylmethane diisocyanate, isophorone diisocyanate, norbornane diisocyanate, hydrogenated xylylene diisocyanate, hydrogenated methylene bisphenylene diisocyanate, 1,4-cyclohexane diisocyanate, and the like; and compounds having two isocyanate groups bonded to aliphatic hydrocarbons such as trimethylene diisocyanate, hexamethylene diisocyanate, and the like. These polyisocyanates may be used alone or in combination of two or more. As used herein, the terms "combination," "combination thereof," and "combinations thereof" may refer to a chemical combination (e.g., an alloy or chemical compound), a mixture, or a laminated structure of components.

According to an exemplary embodiment of the present disclosure, the polyisocyanate may also have a linear structure without a side chain. Therefore, the polymer formed by reacting polyisocyanate with the first polyol and the second polyol may have a linear structure. The polymer may be, for example, polyurethane. As described herein, since the polymer formed by the reaction of the first polyol, the second polyol, and the polyisocyanate has a linear structure, flexibility and wettability of the coating layer made from the resin composition may be improved. Thus, the coating layer may have an excellent bubble-free property.

According to an exemplary embodiment of the present disclosure, a resin composition may include about 10 to about 20 parts by weight of the second polyol, and about 3 to about 8 parts by weight of the polyisocyanate, with respect to 100 parts by weight of the first polyol. The reaction amount of the first polyol, the second polyol, and the polyisocyanate may be controlled by satisfying an above composition ratio of the resin composition. Thus, a coating layer having appropriate or suitable adhesion and a bubble-free property may be formed. When a reaction amount of the first polyol, the second polyol, and the polyisocyanate is less than an appropriate or suitable amount, an adhesion of the coating layer may be lowered. When a reaction amount of the first polyol, the second polyol, and the polyisocyanate is more than an appropriate or suitable amount, an adhesion of the coating layer becomes excessively large, making it difficult to peel off the coating layer from the substrate.

According to an exemplary embodiment of the present disclosure, the resin composition may further include a curing agent and an antistatic agent.

The curing agent aids in curing the resin composition in the aging act. As used herein, the term "act" may be interchanged with the term "stage," "phase," or "segment." For example, the curing agent controls a curing reaction of the resin composition so that the coating layer can have a suitable mechanical and chemical property. The curing agent may include an isocyanate. The curing agent may include, for example, a mixture of dodecanedioic acid and triglycidyl isocyanurate having the following structure.

Dodecanedioic Acid

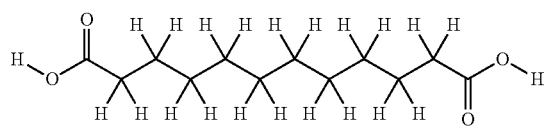 [SMILES: O=C(O)CCCCCCCCCCC(=O)O]

Triglycidyl Isocyanurate

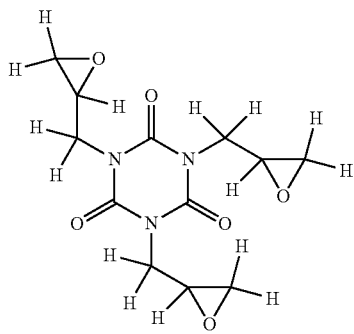 [SMILES: O=c1n(CC2CO2)c(=O)n(CC2CO2)c(=O)n1CC1CO1]

The dodecanedioic acid and triglycidyl isocyanurate in the curing agent may be mixed to a weight ratio of about 10:4 to about 10:6. By mixing triglycidyl isocyanurate with dodecanedioic acid to the above weight ratio, the curing reaction rate may be improved. When triglycidyl isocyanurate is used alone, the curing reaction rate may be relatively slow. By using the curing agent including a mixture of triglycidyl isocyanurate and dodecanedioic acid, a gloss of the coating layer can be reduced and a light transmittance can be improved.

The curing agent may be added to a ratio of about 0.01 to about 1 part by weight based on 100 parts by weight of the resin composition. When the curing agent is included in an amount of less than about 0.01 part by weight, a curing speed of the resin composition may be significantly deteriorated. In addition, when the curing agent is included in an amount of more than about 1 part by weight, the coating layer may be excessively cured, so that flexibility and a bubble-free property of the coating layer may be deteriorated.

According to an exemplary embodiment of the present disclosure, the antistatic agent may include a compound represented by Chemical Formula 3.

M-A  Chemical Formula 3

In Chemical Formula 3, M is a metal element, and A is at least one selected from a chloride anion ($Cl^-$), a bromide anion ($Br^-$), an iodide anion ($I^-$), a tetrachloroaluminate anion ($AlCl_4^-$), a heptachlorodialuminate anion ($Al_2Cl_7^-$), a tetrafluoroborate anion ($BF_4^-$), a hexafluorophosphate anion ($PF_6^-$), a perchlorate anion ($ClO_4^-$), a nitrate anion ($NO_3^-$), an acetate anion ($CH_3COO^-$), a trifluoroacetate anion ($CF_3COO^-$), a methane sulfonate anion ($CH_3SO_3^-$), a trifluoromethanesulfonate anion ($CF_3SO_3^-$), a p-toluenesulfonate anion ($p-CH_3C_6H_4SO_3^-$), a bis (fluorosulfonyl) imide anion ($(FSO_2)_2N^-$), a bis (trifluoromethanesulfonyl) imide anion ($(CF_3SO_2)_2N^-$), a tris (trifluoromethanesulfonyl) ($(CF_3SO_2)_3C^-$), a hexafluoroacenate anion ($AsF_6^-$), a hexafluoroantimonate anion ($SbF_6^-$), a hexafluoroniobate anion ($NbF_6^-$), a hexafluorotantalate anion ($TaF_6^-$), dimethylphosphinate ($(CH_3)_2POO^-$), a dicyanamide anion ($(CN)_2N^-$), a thiocyanic anion ($SCN^-$), a perfluorobutane sulfonate anion ($C_4F_9SO_3^-$), a bis (pentafluoroethanesulfonyl) imide anion ($(C_2F_5SO_2)_2N^-$) and a perfluorobutanoate anion ($C_3F_7COO^-$).

The antistatic agent imparts an antistatic property to the coating layer formed from the resin composition. According to an exemplary embodiment of the present disclosure, the antistatic agent may be in a metal-salt form such as Chemical Formula 3. The antistatic agent in the metal-salt form can coordinate with a non-covalent electron pair of an ether group (—O—) in the first polyol. By combining the antistatic agent with the first polyol, a thermal stability of the antistatic agent can be improved. For example, the antistatic property can be ensured even at a high temperature of 300° C. or higher, and the antistatic agent component does not transfer to a surface of the coating layer or the substrate at the high temperature condition.

An anion of the antistatic agent may include a fluorine atom. For example, the anion of the antistatic agent may be at least one selected from a tetrafluoroborate anion ($BF_4^-$), a hexafluorophosphate anion ($PF_6^-$), a trifluoromethanesulfonate anion ($CF_3SO_3^-$), a bis (fluorosulfonyl) imide anion ($(FSO_2)_2N^-$), a bis (trifluoromethanesulfonyl) imide anion ($(CF_3SO_2)_2N^-$), a tris (trifluoromethanesulfonyl) methanide anion ($(CF_3SO_2)_3C^-$), a hexafluoroacetate anion ($AsF_6^-$), a hexafluoroantimonate anion ($SbF_6^-$), a hexafluoroniobate anion ($NbF_6^-$), and a hexafluorotantalate anion ($TaF_6^-$). Since a fluorine atom has strong electronegativity, an antistatic agent having an anion including the fluorine atom has an excellent antistatic property.

The antistatic agent may be a lithium-based antistatic agent including a lithium element. For example, the lithium-based antistatic agent may have a structure of Chemical Formula 3-1.

Chemical Formula 3-1

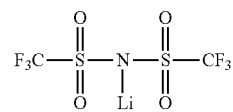

The lithium-based antistatic agent can coordinate with a non-covalent electron pair of an ether group (—O—) in the first polyol, thereby improving thermal stability of the antistatic agent.

The antistatic agent may be included to a ratio of about 0.05 to 0.3 parts by weight based on 100 parts by weight of the resin composition. When the antistatic agent is included in an amount of less than about 0.05 part by weight, antistatic property may be deteriorated, and when the antistatic agent is included in an amount of more than about 0.3 part by weight, the number of a bonding between a non-covalent electron pair of an ether group (—O—) in the first polyol and the antistatic agent is excessively increased, so that a mechanical property of the coating layer may be deteriorated.

The resin composition according to an exemplary embodiment of the present disclosure may further include a tin catalyst. The tin catalyst may be an organotin catalyst, for example, and may be at least one selected from monobutyl tin (MBT), dibutyl tin (DBT), tributyl tin (TBT), tetrabutyl tin (TeBT), mono octyl tin (MOT), dioctyltin (DOT), triphenyltin (TPhT), tricyclohexyltin (TCIT), and dibutyltin dilaulate (DBTDL). The catalyst can promote curing of the resin composition or promote reaction between the first polyol, the second polyol, and/or the polyisocyanate.

The catalyst may be included to a ratio of about 0.01 to about 0.5 parts by weight based on 100 parts by weight of the resin composition. This content of the catalyst is in a range capable of promoting the formation of the coating layer without or substantially without affecting a physical property of the resin composition or the coating layer.

The resin composition according to an exemplary embodiment of the present disclosure may further include at least one solvent selected from the group consisting of toluene, acetone, cyclohexanone, ethyl cellusolve, ethyl acetate, isopropyl alcohol, and ethylene glycol monomethyl ether.

According to an exemplary embodiment of the present disclosure, the first polyol, the second polyol, and the polyisocyanate may be mixed with a first solvent, and the curing agent and antistatic agent may be mixed with a second solvent different from the first solvent. The mixture of the first polyol, the second polyol, and the polyisocyanate and the first solvent, and the mixture of the curing agent and the antistatic agent and the second solvent may then be mixed.

The reason why the first polyol, the second polyol, and the polyisocyanate, and the curing agent and the antistatic agent are mixed in different solvents is to suppress or reduce a side reaction by the curing agent. For example, when the first polyol, the second polyol, the polyisocyanate, and the curing agent are mixed at the same or substantially the same time, a side reaction may occur between the first polyol and/or the second polyol and the curing agent. This side reaction can reduce an amount of reaction between the first polyol, the second polyol and/or the polyisocyanate.

According to an exemplary embodiment of the present disclosure, the resin composition may further include a heat stabilizer, and the heat stabilizer may be a phenolic compound, a phospho compound, or a thio compound. The heat stabilizer improves heat resistance of the resin composition. By adding the heat stabilizer into the resin composition, the first polyol, the second polyol, the polyisocyanate, and a linear polymer formed by reaction thereof in the resin composition can be prevented from thermally decomposing at a high temperature (or a likelihood or amount of such decomposition may be reduced). The heat stabilizer may be included to a ratio of about 0.001 to about 0.6 parts by weight based on 100 parts by weight of the resin composition.

FIG. 1 is a flowchart illustrating a manufacturing method of a coating layer according to an exemplary embodiment of the present disclosure. In addition, FIG. 2 is a flowchart illustrating a method of forming a resin composition according to an exemplary embodiment of the present disclosure.

Referring to FIG. 1, a manufacturing method of a coating layer according to an exemplary embodiment of the present disclosure includes forming a resin composition (S100), coating the resin composition (S200), and aging the resin composition (S300).

Figure 2:
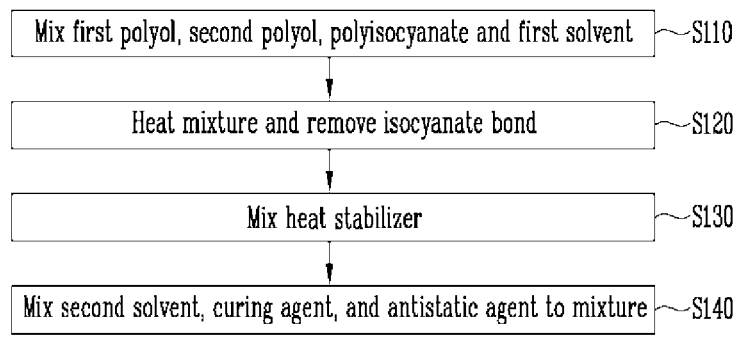
FIG. 2 is a flowchart illustrating a forming method of a resin composition according to an exemplary embodiment of the present disclosure.

Referring to FIG. 2, the forming a resin composition (S100) may include mixing a first polyol, a second polyol, a polyisocyanate and a first solvent (S110), heating a mixture and removing an isocyanate bond (S120), mixing a heat stabilizer (e.g., adding a heat stabilizer to the mixture) (S130), and mixing a second solvent, a curing agent, and an antistatic agent to the mixture (e.g., adding a second solvent, a curing agent, and an antistatic agent to the mixture) (S140).

Hereinafter, acts of the manufacturing method of the coating layer will be described in more detail.

First, in the forming a resin composition (S100), the first polyol, the second polyol, the polyisocyanate, and the first solvent are mixed (S110). The matters relating to the first polyol, the second polyol, the polyisocyanate, and the first solvent are as described herein. These materials may be mixed with stirring at room temperature. At this time, a mixing temperature and method may change depending on the specific material used.

The mixture formed by mixing the first polyol, the second polyol, the polyisocyanate, and the first solvent is heated (S120). By heating the mixture, an isocyanate bond (—NCO) in the mixture may be removed (e.g., the isocyanate group (—NCO) may react with a hydroxyl group). At this time, the mixture may be heated to a temperature of about 60° C. to about 90° C. This temperature range is a temperature range in which the first polyol, the second polyol, the polyisocyanate, and the linear polymer formed by the reaction thereof are not pyrolyzed while removing the isocyanate bond (e.g., while reacting the isocyanate bond, for example, with a hydroxyl group). When the mixture is heated to a temperature less than about 60° C., the isocyanate bond may not be sufficiently or suitably removed, and when the mixture is heated to a temperatures more than about 90° C., the first polyol, the second polyol, the polyisocyanate, and the linear polymer formed by the reaction thereof may be pyrolyzed.

After removing the isocyanate bond, a heat stabilizer may be added to the mixture (S130). The matters relating to the heat stabilizer are as described herein. The heat stabilizer imparts thermal stability to the resin composition so that the linear polymer formed by the reaction of the first polyol, the second polyol, and the polyisocyanate is not pyrolyzed in the subsequent aging act. When the heat stabilizer is added before removing the isocyanate bond, the isocyanate bond may not be removed due to action of the heat stabilizer. Therefore, the heat stabilizer may be added after heating for removing (e.g., reacting) the isocyanate group.

After mixing (e.g., adding) the heat stabilizer to the mixture, a second solvent, a curing agent, and an antistatic agent may be added to the mixture (S140). At this time, the second solvent, curing agent, and antistatic agent may be premixed before being added to the mixture. The reason why the second solvent, the curing agent, and the antistatic agent are added after mixing in a separate act is to prevent the curing agent from reacting with the first polyol or the second polyol as described herein (or to reduce a likelihood or amount of such reaction).

The formed resin composition is coated on a substrate (S200). The amount of the resin composition to be coated may change depending on a composition of the resin composition and a type of the substrate. The resin composition may be coated on the substrates by a method such as a gravure coating, a roll coating, a comma coating, an air knife coating, a kiss coating, a spray coating, a suspension coating, an immersion coating, a spinner coating, a wheeler coating, a brushing, a front coating by a silk screen, a wire bar coating, a flow coating, an offset printing, a letterpress printing, and the like. However, the coating method of the resin composition described herein is merely exemplary, and a person skilled in the art may coat the resin composition on the substrate by using an appropriate or suitable method in addition to the method listed above.

The substrate may be a window of a display device. The substrate may be made of at least one material selected from the group consisting of glass, aluminosilicate (e.g., aluminosilicate glass), borosilicate (e.g., borosilicate glass), and boroaluminosilicate (e.g., boroaluminosilicate glass). However, a material of the substrate is not limited to the materials listed above. In the case where the substrate is a window of a display device, a material having good durability and excellent surface smoothness and transparency in addition to the materials listed above may be used as a substrate.

The substrate may have flexibility. The substrate having flexibility may be bent or folded if necessary or desired. In this case, the substrate may have relatively small bending stiffness so that it can be bent or folded easily. The substrate may have various suitable shapes such as a rectangle, a square, a circle, an ellipse, a semicircle, a half ellipse, and/or the like.

In the case where the substrate includes glass, the substrate may include an ion-exchanged chemically strengthened layer (e.g., a chemical tempered layer). The chemical tempered layer may be formed by performing a chemical strengthening treatment on an outer surface of the substrate. The chemical strengthening treatment may include an ion exchange process. In the ion exchange process for the chemical tempered layer, a cation disposed at or near surface of glass at a temperature lower than a strain point of a substrate is exchanged with another cation of the same valence. For example, alkali metal cations such as Na+ and Li+ in the glass may be exchanged with cations such as K+ by the ion exchange process. The ion exchange process may include the act of supporting the substrate in an ion exchange salt and heating the supported substrate. The ion exchange salt includes ions to be exchanged with ions in the substrate. The ions included in the ion exchange salt may be K+, and ions in the substrate to be exchanged may be Na+ or Li+. The ion exchange salt may be in a nitrate form. When the substrate supported in the ion exchange salt is heated, the ions in the ion exchange salt diffuse through the surface of the substrate. The substrate may be heated at or to a temperature of about 370° C. to about 450° C. for a time period of about 1 hour to about 6 hours.

As the chemically strengthened layer is formed on the substrate, bending rigidity of the substrate is decreased and the substrate and protective cover 100 may be bent or folded more easily. The chemically strengthened layer may provide a compressive stress profile extending from a surface of the substrate to a set or specific position of the substrate to the substrate The chemical strengthening treatment may be performed on one side or both sides of the substrate. In addition, the chemical strengthening treatment may be performed symmetrically or asymmetrically on a front and back sides of the substrate. In the case where the substrate is mainly folded in a set or specific direction, the chemical strengthening treatment may be performed asymmetrically. For example, in the case where the substrate is mainly folded in only one direction, compressive stress may be applied to a surface in which both ends face each other, and tensile stress may be applied to a surface opposite to the surface. In the case where a type of stress mainly applied to both sides of the substrate is different as described herein, the chemical strengthening treatment may be performed asymmetrically.

The coated resin composition may be aged (S300). Aging includes curing and refers to a process for promoting the reaction between components in the resin composition. The aging may be performed at a temperature of about 40° C. to about 140° C. When the aging temperature is less than about 40° C., the reaction between the components in the resin composition may not be suitable or sufficient. In addition, when the aging temperature is more than about 140° C., the components in the resin composition may be pyrolyzed. The pyrolyzed material may react with a surface of the substrate to contaminate the surface of the substrate.

According to an exemplary embodiment of the present disclosure, aging of the resin composition may include a plurality of heating acts. In addition, in the plurality of heating acts, the resin composition may be heated to different temperatures. This is because the resin composition includes a large amount of organic materials. The properties of organic materials may change when the organic materials are heated from a low temperature to a high temperature for a short time. For example, when an organic material at a room temperature is placed in a heating chamber at 140° C., the organic material may be burned or pyrolyzed without being able to withstand abrupt temperature change. Therefore, when a relatively high temperature process is required for the aging, the resin composition should be slowly heated.

According to an exemplary embodiment of the present disclosure, a plurality of heating acts may have different process temperatures and the process temperature of the heating act may sequentially increase according to the process sequence.

The number of heating acts of the aging act may change depending on the composition of the resin composition. According to an exemplary embodiment of the present disclosure, the aging act may include a first heating act, a second heating act, a third heating act, a fourth heating act, a fifth heating act, and a sixth heating act, which are sequentially performed.

Figure 3:
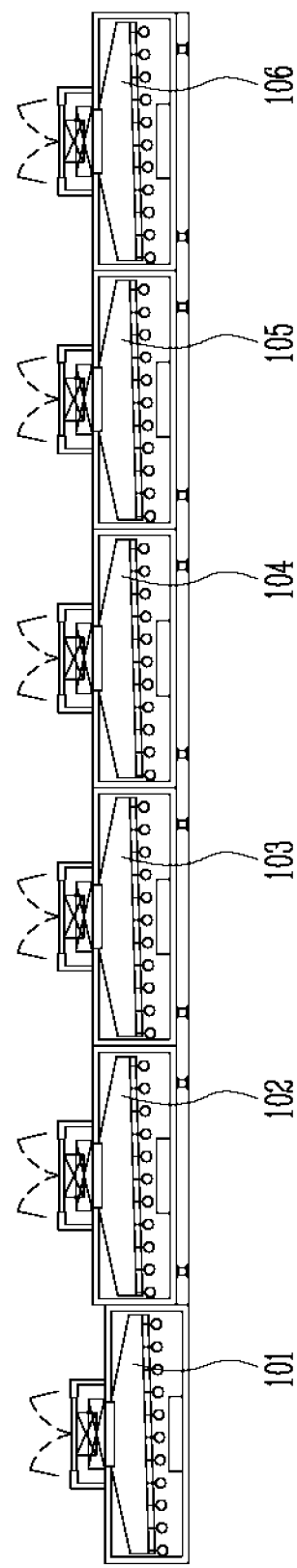
FIG. 3 shows an aging apparatus for performing a first heating act to a sixth heating act.

FIG. 3 shows an aging apparatus for performing a first heating act 101, a second heating act 102, a third heating act 103, a fourth heating act 104, a fifth heating act 105, and a sixth heating act 106. In the aging apparatus, the resin composition and the substrate proceed from the first heating act 101 to the sixth heating act 106.

As described herein, as the resin composition may be denatured by rapid heating, the process temperature of the first heating act 101 to the second heating act 102 in the front of the aging act may be lower than the process temperature of the third heating act 103 to the fifth heating act 105. In addition, the process temperature of the sixth heating act 106 may be lower than the process temperature of the third heating act 103 to the fifth heating act 105 to prevent abrupt temperature change of a coating layer (or to reduce a likelihood or amount of such temperature change).

After the resin composition is aged, a coating layer is formed on the substrate. Another film may be stacked on the coating layer if necessary or desired. For example, a hard coating film, an anti-fingerprint film, an anti-reflection film, or the like may be stacked on the coating layer.

Since the coating layer has excellent adhesion, these films may be stably bonded on the substrate. However, since the coating layer according to embodiments of the present disclosure has peelability, films which are stacked on the substrate and between which the coating layer interposed may be peeled and then reattached if necessary or desired. Even when these films are peeled and then reattached, bubbles are not inserted or formed between the substrate and the coating layer. This is because the coating layer according to embodiments of the present disclosure has an excellent bubble-free property. Therefore, even when the films are peeled and then reattached to the substrate, the substrate and the films and the coating layer are in close contact with each other, thereby having excellent adhesion even after being peeled and reattached.

Hereinafter, the physical property of the resin composition according to Examples of embodiments of the present disclosure and Comparative Examples were tested.

Example 1

About 100 parts by weight of polypropylene glycol, about 12 parts by weight of polyether glycol, about 0.02 parts by weight of dibutyltin dilaurate, about 6 parts by weight of hexamethylene diisocyanate and about 66.78 parts by weight of toluene were mixed in a four-necked flask, and then the temperature was raised to about 80° C. After about 3 hours of reaction, it was confirmed by IR equipment that no residual isocyanate groups were present. Then, about 0.3 part by weight of a heat stabilizer (benzene propanoic acid, 3,5-(1,1-dimethylethyl)-4-hydroxy-2,1-ethanedilester) was added and the reaction was terminated.

5 parts by weight of an isocyanate curing agent (hexamethylene diisocyanate trimer), 0.12 parts by weight of a lithium salt antistatic agent and 100 parts by weight of toluene were mixed with 100 parts by weight of the mixture in which the reaction was terminated to prepare the resin composition of Example 1.

Comparative Example 1

About 100 parts by weight of polymethylsiloxane and about 2.1 parts by weight of a silicone oil were mixed, and then about 2 parts by weight of a crosslinking agent (2,5-dimethyl-2,5-bis (tert-butylperoxy)-hexane) was mixed with about 100 parts by weight of a mixture of the polymethylsiloxane and the silicone oil to prepare the resin composition of Comparative Example 1.

(Evaluation of Physical Property)

The resin compositions of Example 1 and Comparative Example 1 were coated on a PET film to a thickness of about 50 μm, and aged to form a coating layer. Bubble-free property, adhesion, antistatic property, reliability under high-temperature/high-humidity condition, surface energy, and glass surface contamination were measured for the coating layers prepared from the respective resin composition of Example 1 and Comparative Example 1.

When a coating layer having a size of 63 mm×111 mm was formed on the substrate and the coating layer was peeled and then reattached, the bubble-free property was obtained by measuring a time taken to remove bubble inserted or formed in a region from a center of the coating layer to both ends of the coating layer. The time taken to remove the bubble was measured five times, and the time described herein is an average of five measurements. The shorter the time taken to remove the bubble, the less bubble is (or the fewer bubbles are) inserted or formed between the substrate and the coating layer, and the bubble can be easily removed. Therefore, the bubble-free property is excellent for coating layers that have a short time to remove the bubbles.

The adhesion between the coating layer and the glass was measured at a head speed of 150 mm/min using UTM (Universal Testing Machine: DTU-900MHA). The adhesion was measured three times, and the adhesion described herein is an average of three measurements. Since the coating layer and the substrate according to embodiments of the present disclosure may be repeatedly peeled and reattached to each other, the adhesion of the coating layer may be at an appropriate or suitable level. Herein, the appropriate or suitable level may change according to the kind of substrate, and may be from about 1.0 gf/in to about 3.0 gf/in for a glass substrate.

The antistatic property was obtained by measuring surface resistance of the coating layer using a resistance meter. The antistatic property was measured three times, and the surface resistance described herein is an average of three measurements. The lower the surface resistance of the coating layer, the better the antistatic property.

The reliability at a high temperature and high humidity condition is obtained by measuring physical property of the coating layer after forming the coating layers using the respective resin composition of Example 1 and Comparative Example 1 and then leaving the coating layer at a high temperature and high humidity condition for a long time. The reliability of the coating layers at a high temperature and high humidity condition was measured after leaving the coating layers at a temperature of about 60° C. and a humidity of about 93% for about 120 hours, and after leaving the coating layers at a temperature of about 85° C. and a humidity of about 85% for about 120 hours. The reliability evaluation was obtained by measuring the physical property of the coating layer subjected to the high temperature and high humidity condition over three days. The measured physical properties are the bubble-free property, the adhesion, the antistatic property, the surface energy, and the glass surface contamination of the coating layer.

The surface energy property was obtained by measuring the surface tension of the coating layer. That is, the surface energy property was obtained by measuring a surface tension of an ink layer by using a Dyne pen on the surface of the coating layer.

The glass surface contamination was obtained by checking whether the coating layer or the resin composition remains on the glass surface when the coating layer is peeled after the coating layer is formed on the glass. The glass surface contamination was visually checked under a 3-wavelength lamp and rated 0 to 5.

Hereinafter, the physical property evaluation value of the coating layer formed using the resin compositions of Example 1 and Comparative Example 1 is shown. Table 1 shows the physical property of the resin composition of Example 1 and Comparative Example 1 before and after reliability evaluation. The reliability evaluation condition is for about 120 hours at a temperature of about 60° C. and a humidity of about 93%.

TABLE 1

| | Bubble-free property | | Adherence | | Antistatic property | | Surface energy | | Glass surface contamination | |
|---|---|---|---|---|---|---|---|---|---|---|
| | Example 1 | Comparative Example 1 | Example 1 | Comparative Example 1 | Example 1 | Comparative Example 1 | Example 1 | Comparative Example 1 | Example 1 | Comparative Example 1 |
| Before applying reliability evaluation condition | 1.1 sec | 1.25 sec | 1.6 gf/in | 1.8 gf/in | $10^9$ $\Omega/m^2$ | $10^{12}$ $\Omega/m^2$ | 38 dyne/cm | 38 dyne/cm | 0 | 0 |
| 1 day after applying reliability evaluation condition | 1.18 sec | 1.42 sec | 1.3 gf/in | 1.9 gf/in | $10^{8.6}$ $\Omega/m^2$ | $10^{12}$ $\Omega/m^2$ | 38 dyne/cm | 32 dyne/cm | 0 | 1 |
| 2 day after applying reliability evaluation condition | 1.21 sec | 1.33 sec | 1.5 gf/in | 1.8 gf/in | $10^{9.2}$ $\Omega/m^2$ | $10^{12}$ $\Omega/m^2$ | 38 dyne/cm | 30 dyne/cm | 0 | 2 |
| 3 day after applying reliability evaluation condition | 1.28 sec | 1.28 sec | 1.7 gf/in | 1.6 gf/in | $10^{8.8}$ $\Omega/m^2$ | $10^{12}$ $\Omega/m^2$ | 40 dyne/cm | 31 dyne/cm | 0 | 2 |

Hereinafter, the physical property evaluation values of the coating layers formed using the respective resin compositions of Example 1 and Comparative Example 1 are shown. Table 2 shows the physical property of the resin composition of Example 1 and Comparative Example 1 before and after reliability evaluation. The reliability evaluation condition is for about 120 hours at a temperature of about 85° C. and a humidity of about 85%.

TABLE 2

| | Bubble-free property | | Adhesion | | Antistatic property | | Surface energy | | Glass surface contamination | |
|---|---|---|---|---|---|---|---|---|---|---|
| | Example 1 | Comparative Example 1 | Example 1 | Comparative Example 1 | Example 1 | Comparative Example 1 | Example 1 | Comparative Example 1 | Example 1 | Comparative Example 1 |
| Before applying reliability evaluation condition | 1.1 sec | 1.25 sec | 1.6 gf/in | 1.6 gf/in | $10^9$ $\Omega/m^2$ | $10^{12}$ $\Omega/m^2$ | 38 dyne/cm | 38 dyne/cm | 0 | 0 |
| 1 day after applying reliability evaluation condition | 1.2 sec | 1.44 sec | 1.8 gf/in | 2.5 gf/in | $10^{8.6}$ $\Omega/m^2$ | $10^{12}$ $\Omega/m^2$ | 39 dyne/cm | 35 dyne/cm | 0 | 2 |
| 2 day after applying reliability evaluation condition | 1.32 sec | 1.45 sec | 1.8 gf/in | 2.8 gf/in | $10^{8.7}$ $\Omega/m^2$ | $10^{12}$ $\Omega/m^2$ | 37 dyne/cm | 32 dyne/cm | 0 | 3 |
| 3 day after applying reliability evaluation condition | 1.35 sec | 1.32 sec | 2.5 gf/in | 2.9 gf/in | $10^{9.0}$ $\Omega/m^2$ | $10^{12}$ $\Omega/m^2$ | 38 dyne/cm | 30 dyne/cm | 0 | 3 |

It was confirmed that the coating layer formed from the resin composition of Example 1 was excellent in the bubble-free property, the antistatic property, the surface energy and the glass surface contamination and both before and after the reliability evaluation. In the evaluation of the adhesion, all the coating layers formed from the respective resin composition of Example 1 and Comparative Example 1 had the adhesion in a range of about 1.0 gf/in to about 3.0 gf/in. Therefore, it was confirmed that all the coating layers formed from the respective resin compositions of Example 1 and Comparative Example 1 were suitable for repeated peeling and bonding.

(Evaluation of Aging Condition)

With respect to the resin composition of Example 1, the physical property of the coating layer was evaluated while changing a process temperature in the heating act of the aging act. The evaluated physical properties are bubble-free property, adhesion, antistatic property, surface energy, and glass surface contamination. The aging act includes six sequential heating acts, and the process temperatures in each act are shown in Table 3 below. That is, coating layers of Example 2, Comparative Example 2, and Comparative Example 3 were prepared by heating a coating layer prepared according to Example 1 as set forth in Table 3.

TABLE 3

|  | First heating act | Second heating act | Third heating act | Fourth heating act | Fifth heating act | Sixth heating act |
|---|---|---|---|---|---|---|
| Example 2 | 30–40° C. | 80–90° C. | 100–110° C. | 120–140° C. | 110–130° C. | 70–80° C. |
| Comparative Example 2 | 15–25° C. | 30–40° C. | 60–70° C. | 90–100° C. | 110–120° C. | 60–70° C. |
| Comparative Example 3 | 70–80° C. | 90–100° C. | 110–120° C. | 120–140° C. | 160–150° C. | 80–90° C. |

Hereinafter, the physical property evaluation according to Example 2 and Comparative Examples 2 and 3 is shown. Table 4 and Table 5 show a result of performing reliability evaluation for about 120 hours at a temperature of about 60° C. and a humidity of about 93%, and Table 6 and Table 7 shows a result of performing reliability evaluation for about 120 hours at a temperature of about 85° C. and a humidity of about 85%.

TABLE 4

|  | Bubble-free property | | Adhesion | | Antistatic property | | Surface energy | | Glass surface contamination | |
|---|---|---|---|---|---|---|---|---|---|---|
|  | Example 2 | Comparative Example 2 | Example 2 | Comparative Example 2 | Example 2 | Comparative Example 2 | Example 2 | Comparative Example 2 | Example 2 | Comparative Example 2 |
| Before applying reliability evaluation condition | 1.1 sec | 4.25 sec | 1.6 gf/in | 5.5 gf/in | $10^9$ Ω/m² | $10^9$ Ω/m² | 38 dyne/cm | 38 dyne/cm | 0 | 0 |
| 1 day after applying reliability evaluation condition | 1.18 sec | 5.55 sec | 1.3 gf/in | 9.8 gf/in | $10^{8.6}$ Ω/m² | $10^{8.8}$ Ω/m² | 38 dyne/cm | 35 dyne/cm | 0 | 3 |
| 2 day after applying reliability evaluation condition | 1.21 sec | 8.8 sec | 1.5 gf/in | 12.5 gf/in | $10^{9.2}$ Ω/m² | $10^{9.3}$ Ω/m² | 38 dyne/cm | 33 dyne/cm | 0 | 5 |
| 3 day after applying reliability evaluation condition | 1.28 sec | 12.11 sec | 1.7 gf/in | 23.7 gf/in | $10^{8.8}$ Ω/m² | $10^{9.0}$ Ω/m² | 40 dyne/cm | 33 dyne/cm | 0 | 5 |

TABLE 5

|  | Bubble-free property | | Adhesion | | Antistatic property | | Surface energy | | Glass surface contamination | |
|---|---|---|---|---|---|---|---|---|---|---|
|  | Example 2 | Comparative Example 3 | Example 2 | Comparative Example 3 | Example 2 | Comparative Example 3 | Example 2 | Comparative Example 3 | Example 2 | Comparative Example 3 |
| Before applying reliability evaluation condition | 1.1 sec | 2.21 sec | 1.6 gf/in | 2.8 gf/in | $10^9$ Ω/m² | $10^{9.2}$ Ω/m² | 38 dyne/cm | 38 dyne/cm | 0 | 0 |
| 1 day after applying reliability evaluation condition | 1.18 sec | 2.55 sec | 1.3 gf/in | 2.9 gf/in | $10^{8.6}$ Ω/m² | $10^{8.5}$ Ω/m² | 38 dyne/cm | 36 dyne/cm | 0 | 2 |

TABLE 5-continued

|  | Bubble-free property | | Adhesion | | Antistatic property | | Surface energy | | Glass surface contamination | |
| --- | --- | --- | --- | --- | --- | --- | --- | --- | --- | --- |
|  | Example 2 | Comparative Example 3 | Example 2 | Comparative Example 3 | Example 2 | Comparative Example 3 | Example 2 | Comparative Example 3 | Example 2 | Comparative Example 3 |
| 2 day after applying reliability evaluation condition | 1.21 sec | 3.11 sec | 1.5 gf/in | 2.1 gf/in | $10^{9.2}$ $\Omega/m^2$ | $10^{9.5}$ $\Omega/m^2$ | 38 dyne/cm | 34 dyne/cm | 0 | 2 |
| 3 day after applying reliability evaluation condition | 1.28 sec | 2.85 sec | 1.7 gf/in | 2.3 gf/in | $10^{8.8}$ $\Omega/m^2$ | $10^{8.9}$ $\Omega/m^2$ | 40 dyne/cm | 34 dyne/cm | 0 | 2 |

TABLE 6

|  | Bubble-free property | | Adhesion | | Antistatic property | | Surface energy | | Glass surface contamination | |
| --- | --- | --- | --- | --- | --- | --- | --- | --- | --- | --- |
|  | Example 2 | Comparative Example 2 | Example 2 | Comparative Example 2 | Example 2 | Comparative Example 2 | Example 2 | Comparative Example 2 | Example 2 | Comparative Example 2 |
| Before applying reliability evaluation condition | 1.1 sec | 4.25 sec | 1.6 gf/in | 5.5 gf/in | $10^9$ $\Omega/m^2$ | $10^9$ $\Omega/m^2$ | 38 dyne/cm | 38 dyne/cm | 0 | 0 |
| 1 day after applying reliability evaluation condition | 1.2 sec | 6.33 sec | 1.8 gf/in | 10.21 gf/in | $10^{8.6}$ $\Omega/m^2$ | $10^{8.6}$ $\Omega/m^2$ | 39 dyne/cm | 33 dyne/cm | 0 | 5 |
| 2 day after applying reliability evaluation condition | 1.32 sec | 9.21 sec | 1.8 gf/in | 15.78 gf/in | $10^{8.7}$ $\Omega/m^2$ | $10^{9.2}$ $\Omega/m^2$ | 37 dyne/cm | 32 dyne/cm | 0 | 5 |
| 3 day after applying reliability evaluation condition | 1.35 sec | 14.56 sec | 2.5 gf/in | 29.22 gf/in | $10^{9.0}$ $\Omega/m^2$ | $10^{9.0}$ $\Omega/m^2$ | 38 dyne/cm | 32 dyne/cm | 0 | 5 |

TABLE 7

|  | Bubble-free property | | Adhesion | | Antistatic property | | Surface energy | | Glass surface contamination | |
| --- | --- | --- | --- | --- | --- | --- | --- | --- | --- | --- |
|  | Example 2 | Comparative Example 3 | Example 2 | Comparative Example 3 | Example 2 | Comparative Example 3 | Example 2 | Comparative Example 3 | Example 2 | Comparative Example 3 |
| Before applying reliability evaluation condition | 1.1 sec | 2.21 sec | 1.6 gf/in | 1.6 gf/in | $10^9$ $\Omega/m^2$ | $10^{9.2}$ $\Omega/m^2$ | 38 dyne/cm | 38 dyne/cm | 0 | 0 |
| 1 day after applying reliability evaluation condition | 1.2 sec | 2.35 sec | 1.8 gf/in | 2.5 gf/in | $10^{8.6}$ $\Omega/m^2$ | $10^{8.7}$ $\Omega/m^2$ | 39 dyne/cm | 36 dyne/cm | 0 | 2 |
| 2 day after applying reliability evaluation condition | 1.32 sec | 3.88 sec | 1.8 gf/in | 2.8 gf/in | $10^{8.7}$ $\Omega/m^2$ | $10^{9.2}$ $\Omega/m^2$ | 37 dyne/cm | 34 dyne/cm | 0 | 2 |
| 3 day after applying reliability evaluation condition | 1.35 sec | 3.55 sec | 2.5 gf/in | 2.9 gf/in | $10^{9.0}$ $\Omega/m^2$ | $10^{9.0}$ $\Omega/m^2$ | 38 dyne/cm | 34 dyne/cm | 0 | 2 |

Referring to Tables 4 to 7, it can be confirmed that Example 2 exhibits excellent physical property under two reliability evaluation conditions. Thus, it can be confirmed that maintaining the process temperature of about 100° C. to about 140° C. in the third to fifth heating act, maintaining the process temperature of about 30° C. to about 40° C. in the first heating act, and maintaining the process temperature of about 70° C. to about 90° C. in the second and sixth heating act are an optimized aging condition.

Table 8 shows adhesion data of the coating layer for aged day (e.g., aged for a number of days) according to embodiments of the present disclosure. The adhesion was evaluated at about 60° C.

TABLE 8

| Aged day | Adhesion |
|---|---|
| 0 | 39.00 gf/in |
| 1 | 2.73 gf/in |
| 2 | 1.64 gf/in |
| 3 | 1.42 gf/in |
| 4 | 1.33 gf/in |
| 5 | 1.45 gf/in |
| 6 | 1.61 gf/in |
| 7 | 1.43 gf/in |

Referring to Table 8, it can be confirmed that the adhesion of the coating layer decreases as the number of aged day increases. As described herein, since the coating layer according to embodiments of the present disclosure must ensure peeling and reattachment of the coating layer and the substrate, the coating layer may have an adhesion of about 1.0 gf/in to about 3.0 gf/in. According to Table 8, the coating layer may have more than one day of aging to control the adhesion.

While the subject matter of the present disclosure has been shown and described with reference to certain exemplary embodiments thereof, it will be understood by those skilled in the art that various changes in form and details may be made therein without departing from the spirit and scope of the present disclosure as defined by the appended claims and their equivalents.

Accordingly, the technical scope of the present disclosure may be determined by on the technical scope of the accompanying claims.

DESCRIPTION OF SOME OF THE SYMBOLS

101-106: first heating act-sixth heating act

What is claimed is:

1. A manufacturing method of a coating layer, the method comprising:
   forming a resin composition by mixing a first polyol represented by Chemical Formula 1, a second polyol represented by Chemical Formula 2, and a polyisocyanate together with a first solvent;
   coating the resin composition on a substrate; and
   aging the resin composition,
   wherein the first polyol and the second polyol have a linear structure without a side chain,

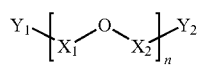   Chemical Formula 1

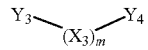   Chemical Formula 2 wherein, in Chemical Formula 1 and Chemical Formula 2,
   each of $Y_1$ to $Y_4$ is H or OH—, at least one of $Y_1$ and $Y_2$ is OH—, at least one of $Y_3$ and $Y_4$ is OH—,
   each of $X_1$ to $X_3$ is independently selected from an unsubstituted $C_1$-$C_{20}$ alkyl group, and a $C_1$-$C_{20}$ alkyl group substituted with at least one selected from an unsaturated bond, —$CH_2$— in the alkyl group may be substituted or unsubstituted with —CHOH—,
   each of n and m is independently 1 to 200,
   wherein the aging the resin composition includes a plurality of heating acts,
   wherein the plurality of heating acts have different process temperatures, and
   wherein the plurality of heating acts include a first heating act to a sixth heating act which are sequentially performed.

2. The manufacturing method of a coating layer of claim 1, wherein the forming the resin composition further comprises:
   mixing a mixture of a second solvent different from the first solvent, a curing agent and an antistatic agent mixture with a mixture of the first polyol, the second polyol, the polyisocyanate and the first solvent.

3. The manufacturing method of a coating layer of claim 2, further comprising:
   heating the mixture of the first polyol, the second polyol, the polyisocyanate and the first solvent to remove isocyanate bonds in the mixture of the first polyol, the second polyol, the polyisocyanate, and the first solvent.

4. The manufacturing method of a coating layer of claim 3, wherein:
   the mixture of the first polyol, the second polyol, the polyisocyanate and the first solvent is heated at about 60° C. to about 90° C.

5. The manufacturing method of a coating layer of claim 4, wherein:
   a heat stabilizer is added to the mixture of the first polyol, the second polyol, the polyisocyanate and the first solvent after heating the mixture of the first polyol, the second polyol, the polyisocyanate and the first solvent.

6. The manufacturing method of a coating layer of claim 2, wherein:
   the antistatic agent comprises a compound represented by Chemical Formula 3,

   Chemical Formula 3 wherein, in Chemical Formula 3, M is a metal element, and A is at least one selected from a chloride anion ($Cl^-$), a bromide anion ($Br^-$), an iodide anion ($I^-$), a tetrachloroaluminate anion ($AlCl_4^-$), a heptachlorodialuminate anion ($Al_2Cl_7^-$), a tetrafluoroborate anion ($BF_4^-$), a hexafluorophosphate anion ($PF_6^-$), a perchlorate anion ($ClO_4^-$), a nitrate anion ($NO_3^-$), an acetate anion ($CH_3COO^-$), a trifluoroacetate anion ($CF_3COO^-$), a methane sulfonate anion ($CH_3SO_3^-$), a trifluoromethanesulfonate anion ($CF_3SO_3^-$), a p-toluenesulfonate anion (p-$CH_3C_6H_4SO_3^-$), a bis (fluorosulfonyl) imide anion (($FSO_2)_2N^-$), a bis (trifluoromethanesulfonyl) imide anion (($CF_3SO_2)_2N^-$), a tris (trifluoromethanesulfonyl) (($CF_3SO_2)_3C^-$), a hexafluoroacenate anion ($AsF_6^-$), a hexafluoroantimonate anion ($SbF_6^-$), a hexafluoroniobate anion ($NbF_6^-$), a hexafluorotantalate anion ($TaF_6^-$), dimethylphosphinate ($(CH_3)_2POO^-$), a dicyanamide anion ($(CN)_2N^-$), a thiocyanic anion ($SCN^-$), a perfluorobutane sulfonate anion ($C_4F_9SO_3^-$), a bis (pentafluoroethanesulfonyl) imide anion ($(C_2F_5SO_2)_2N^-$) and a perfluorobutanoate anion ($C_3F_7COO^-$).

7. The manufacturing method of a coating layer of claim 1, wherein:
a process temperature of the plurality of heating acts sequentially increases according to a process sequence.

8. The manufacturing method of a coating layer of claim 1, wherein:
a process temperature of the first heating act is about 30° C. to about 40° C.

9. The manufacturing method of a coating layer of claim 1, wherein:
a process temperature of the third heating act, the fourth heating act, and the fifth heating act is about 100° C. to about 140° C.

10. The manufacturing method of a coating layer of claim 1, wherein:
a process temperature of the second heating act and the sixth heating act is about 70° C. to about 90° C.

11. The manufacturing method of a coating layer of claim 1, wherein:
the coating layer has an adhesion of about 1.0 gf/in to about 3.0 gf/in.

12. The manufacturing method of a coating layer of claim 1, wherein:
the second polyol is present in an amount of about 10 to about 20 parts by weight, and the polyisocyanate is present in an amount of about 3 to about 8 parts by weight, based on 100 parts by weight of the first polyol.

13. A manufacturing method of a coating layer, the method comprising:
forming a resin composition by mixing a first polyol represented by Chemical Formula 1, a second polyol represented by Chemical Formula 2, and a polyisocyanate together with a first solvent;
coating the resin composition on a substrate; and
aging the resing composition,
wherein the first polyol and the second polyol have a linear structure without a side chain,

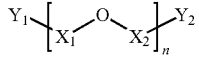

Chemical Formula 1

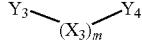

Chemical Formula 2 wherein, in Chemical Formula 1 and Chemical Formula 2, each of $Y_1$ to $Y_4$ is H or —OH, at least one of $Y_1$ and $Y_2$ is —OH, at least one of $Y_3$ and $Y_4$ is —OH,
each of $X_1$ to $X_3$ is independently selected from an unsubstituted $C_1$-$C_{20}$ alkyl group, and a $C_1$-$C_{20}$ alkyl group substituted with at least one selected from an unsaturated bond, —$CH_2$— in the alkyl group may be substituted or unsubstituted with —CHOH—,
each of n and m is independently 1 to 200,
wherein the aging the resin composition includes a plurality of heating acts,
wherein the plurality of heating acts include a first heating act to a sixth heating act which are sequentially performed, and
wherein:
a process temperature of the first heating act, the second heating act and the sixth heating act is less than a process temperature of the third heating act to the fifth heating act.

14. A manufacturing method of a coating layer, the method comprising:
forming a resin composition by mixing a first polyol represented by Chemical Formula 1, a second polyol represented by Chemical Formula 2, and a polyisocyanate together with a first solvent;
coating the resin composition on a substrate; and
aging the resing composition,
wherein the first polyol and the second polyol have a linear structure without a side chain,

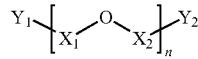

Chemical Formula 1

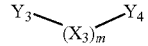

Chemical Formula 2 wherein, in Chemical Formula 1 and Chemical Formula 2, each of $Y_1$ to $Y_4$ is H or —OH, at least one of $Y_1$ and $Y_2$ is —OH, at least one of $Y_3$ and $Y_4$ is —OH,
each of $X_1$ to $X_3$ is independently selectd from an unsubstituted $C_1$-$C_{20}$ alkyl group, and a $C_1$-$C_{20}$ alkyl group substituted with at least one selected from an unsaturated bond, —$CH_2$— in the alkyl group may be substituted or unsubstituted with —CHOH—,
each of n and m is independently 1 to 200,
wherein the aging the resin composition includes a plurality of heating acts,
wherein the plurality of heating acts include a first heating act to a sixth heating act which are sequentially performed, and
wherein:
a process temperature of the first heating act is about 30° C. to about 40° C.,
a process temperature of the third heating act, the fourth heating act, and the fifth heating act is about 100° C. to about 140° C., and
a process temperature of the second heating act and the sixth heating act is about 70° C. to about 90° C.

* * * * *